F. P. ROSBACK.
PERFORATING MACHINE.
APPLICATION FILED JAN. 13, 1914.
1,125,723.
Patented Jan. 19, 1915.
7 SHEETS—SHEET 7.
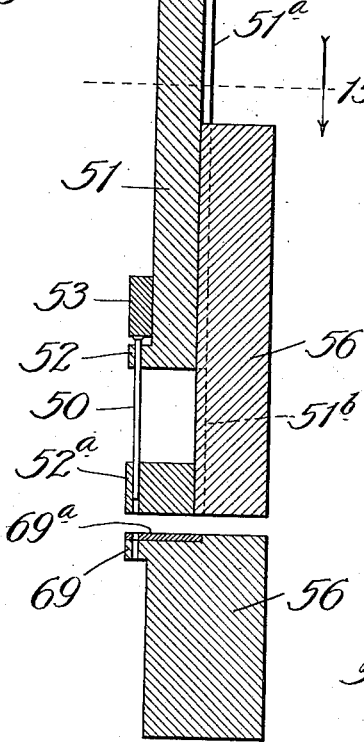
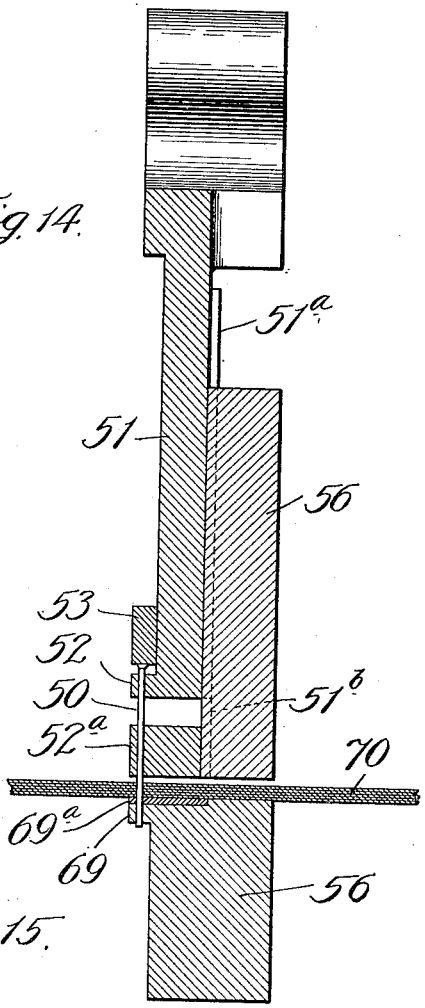
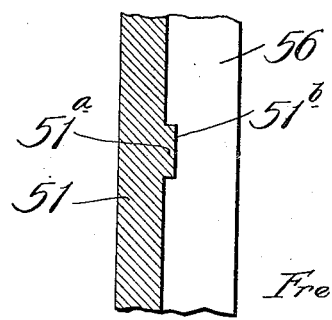
Witnesses:
Inventor:
Frederick P. Rosback,
By Dyrenforth, Lee, Chritton & Wiles
Attys.

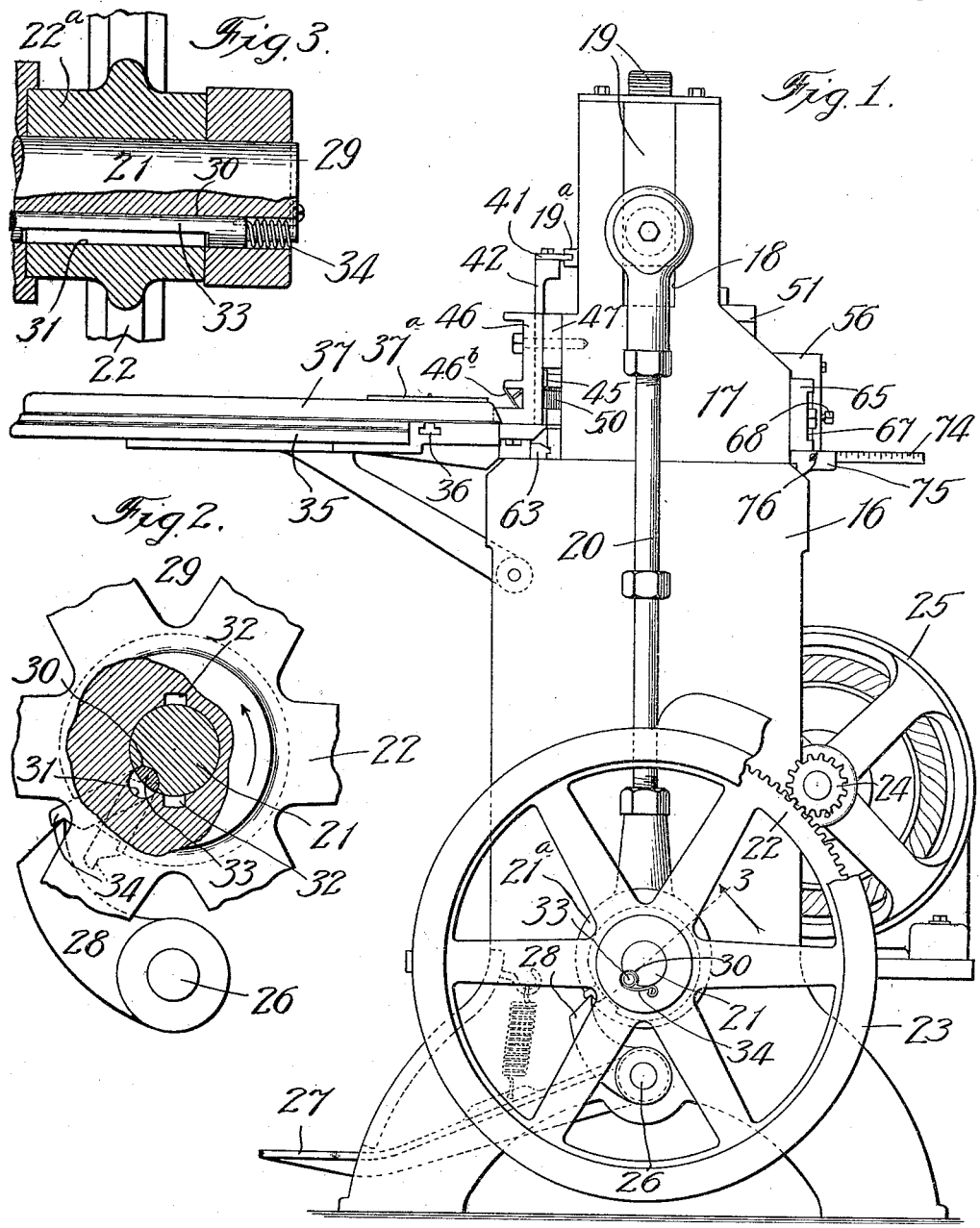

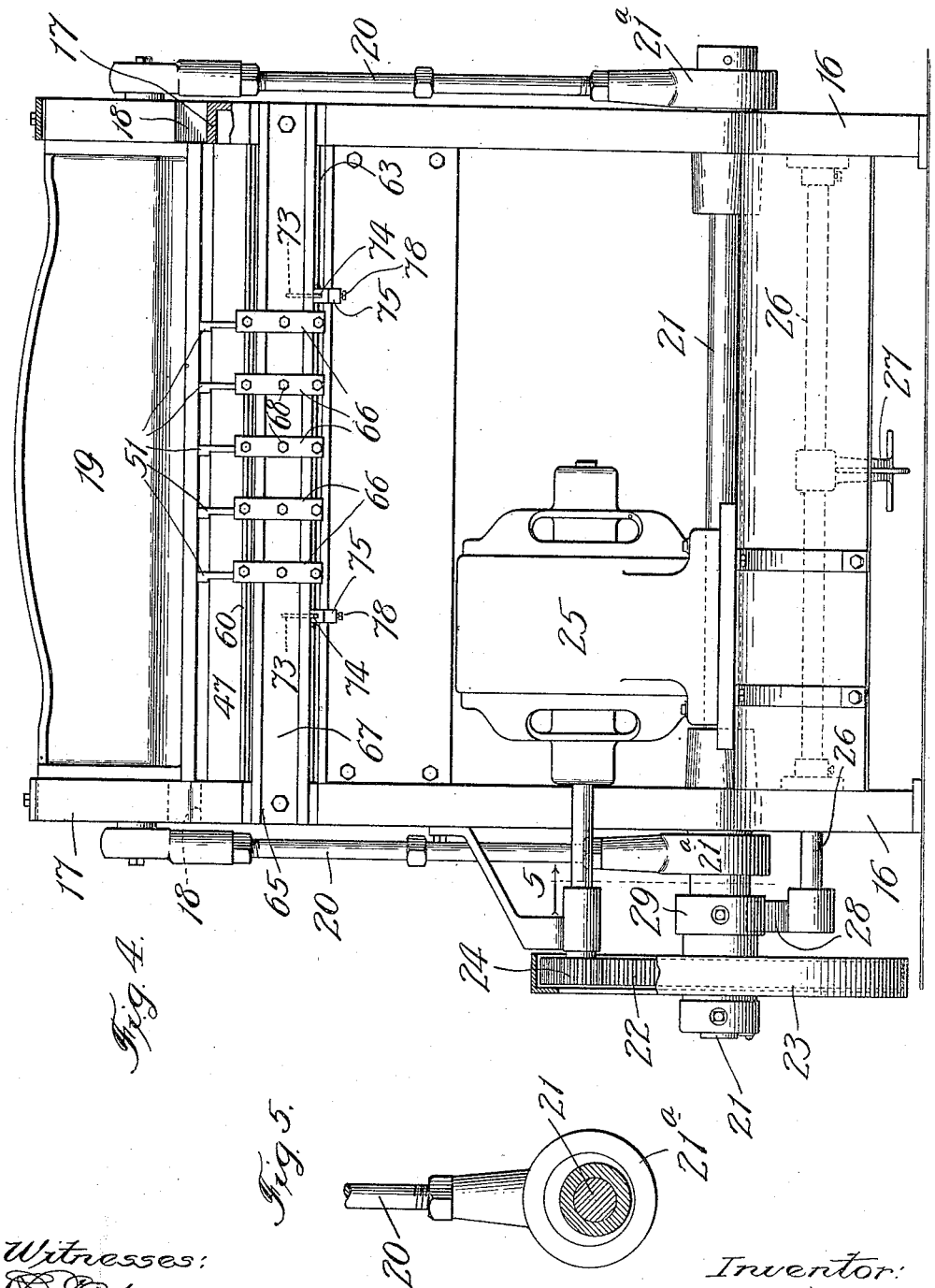

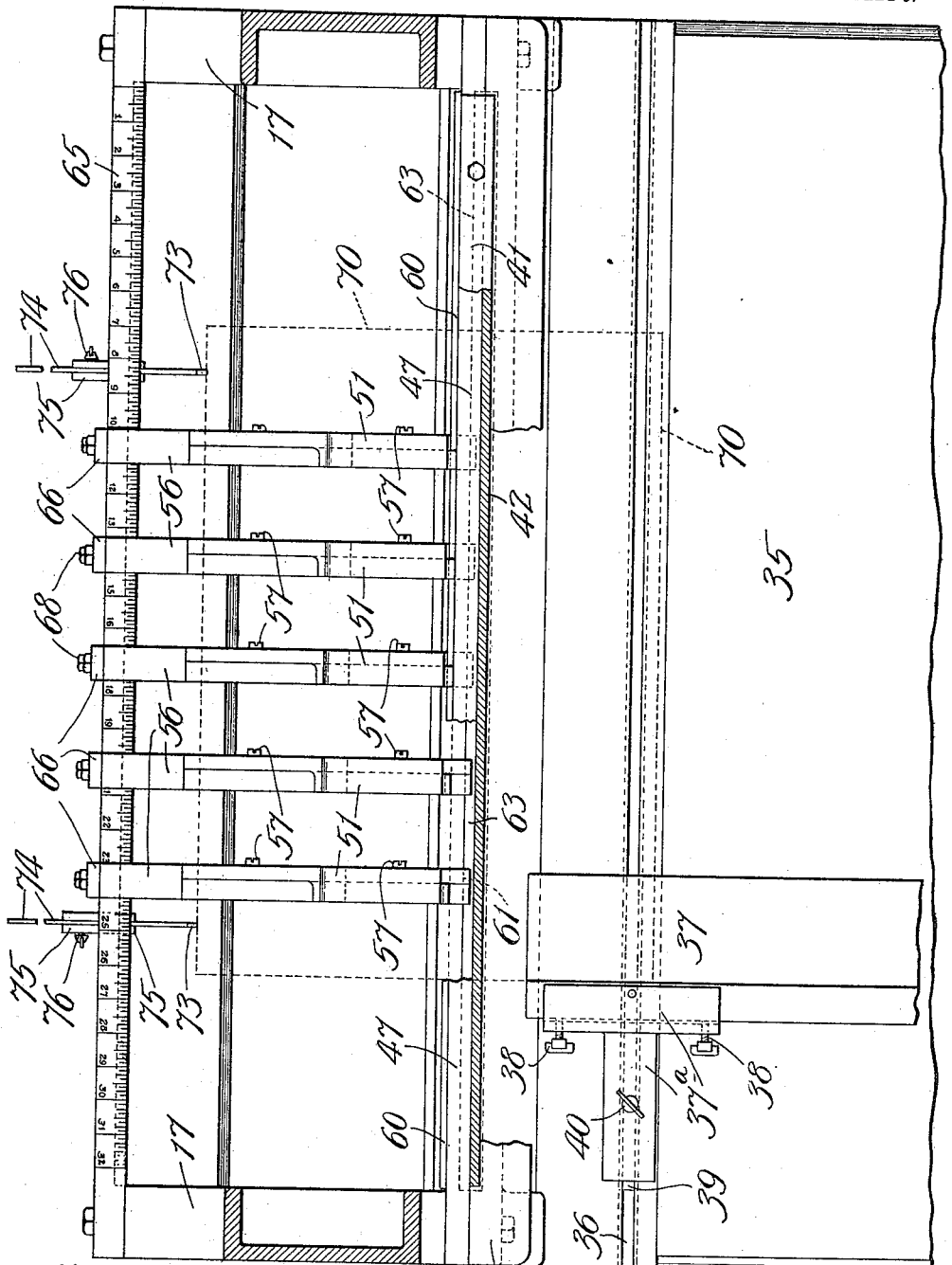

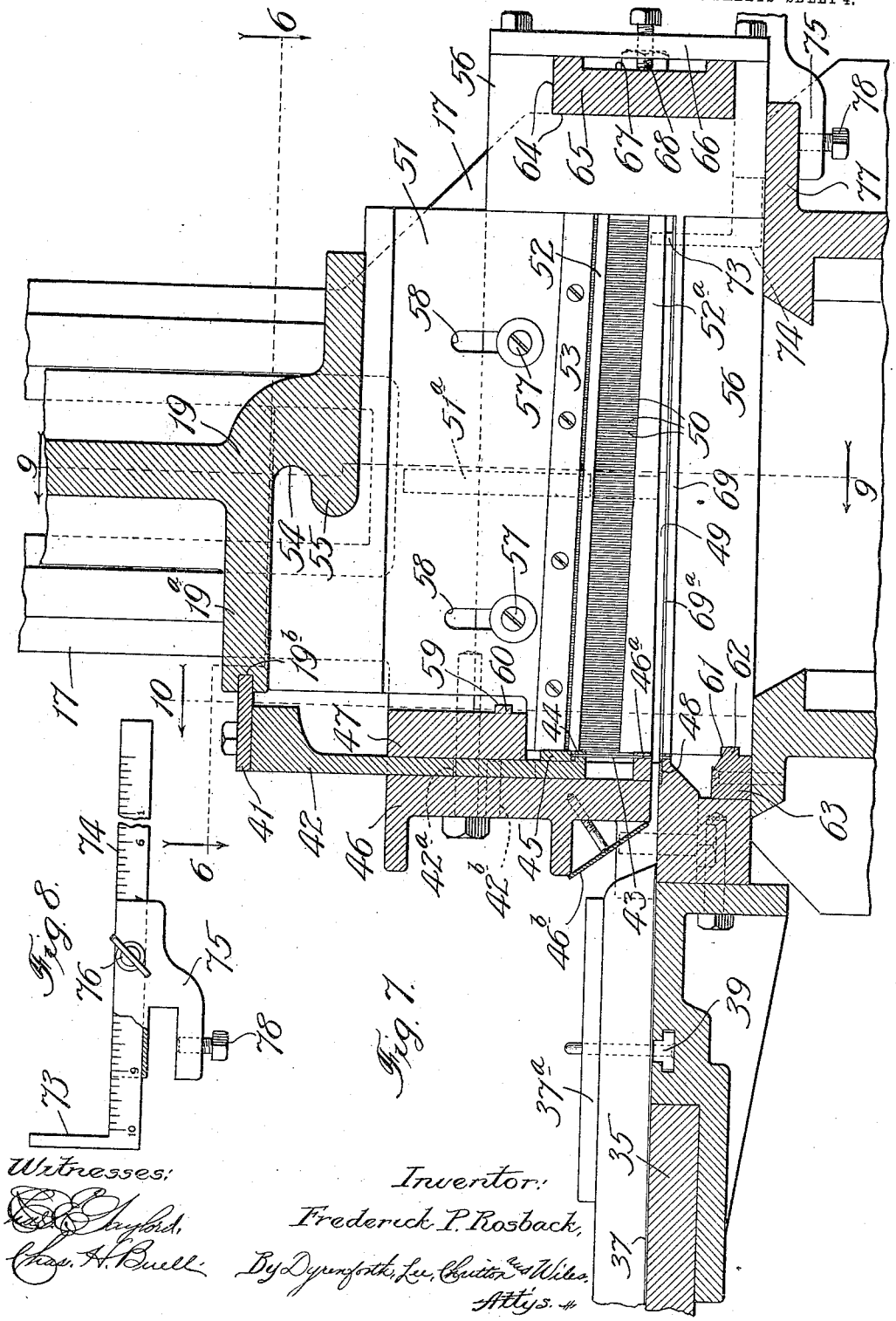

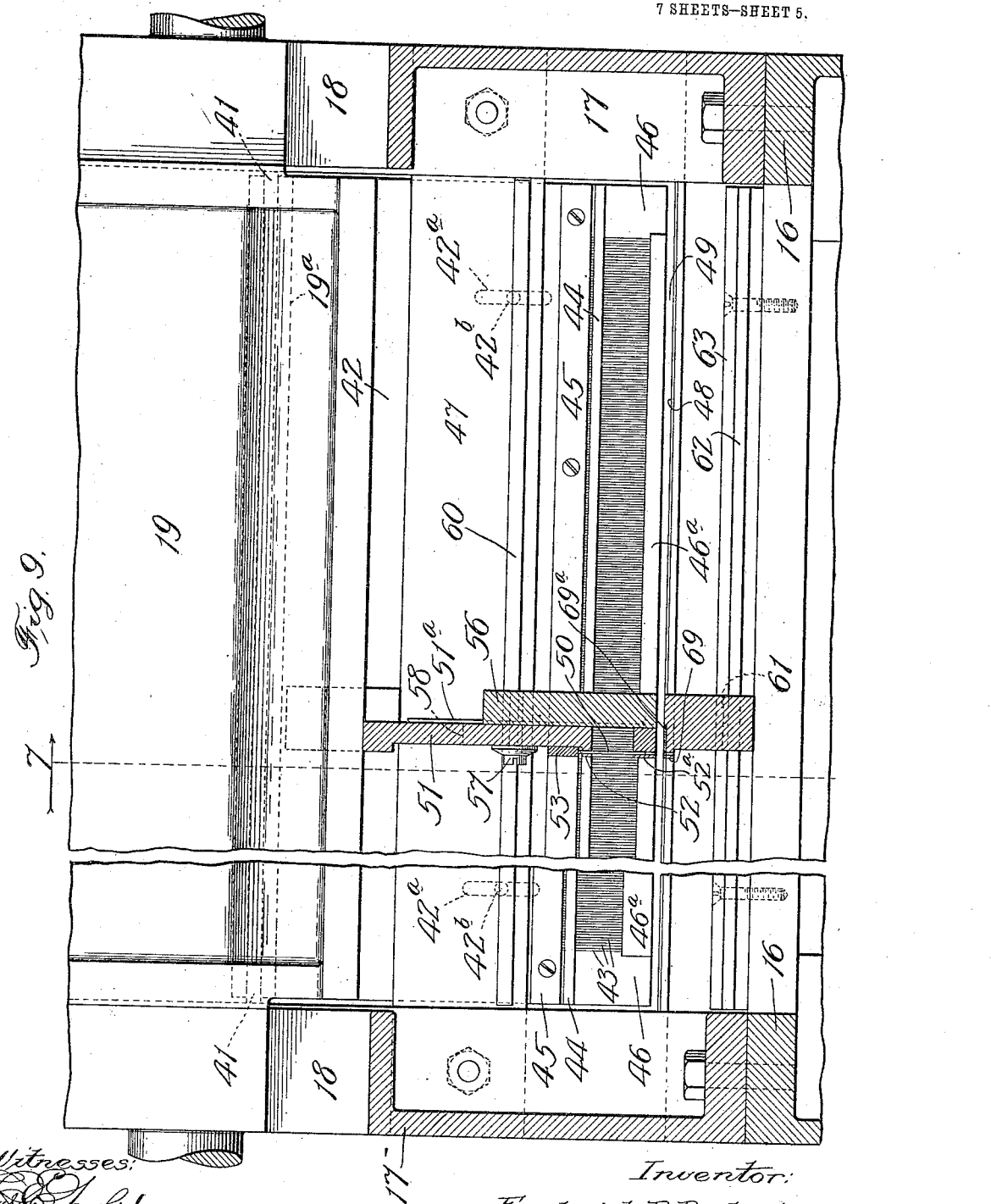

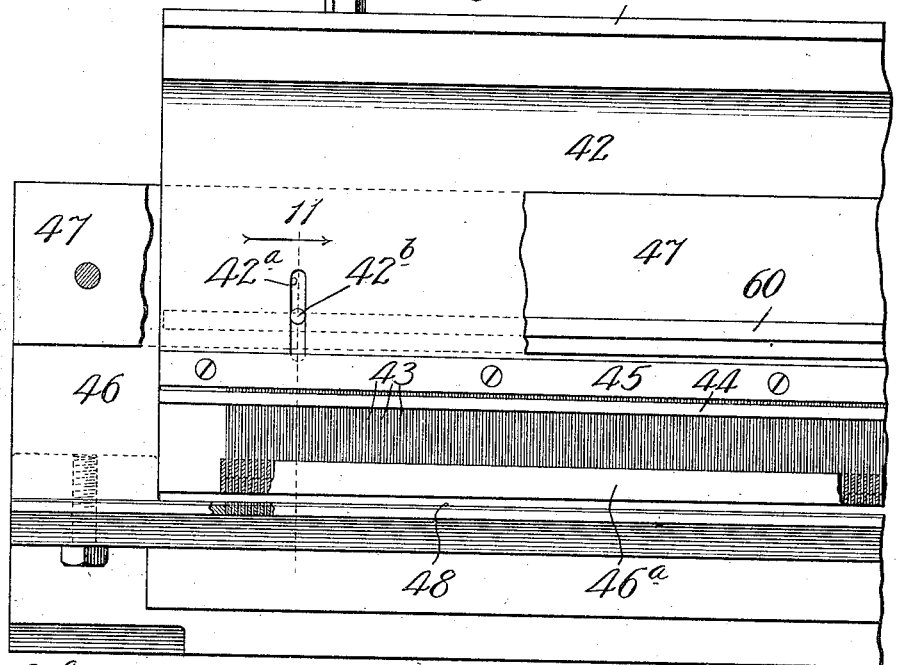
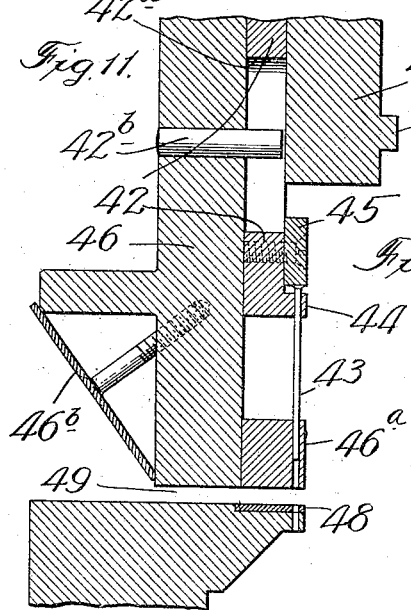
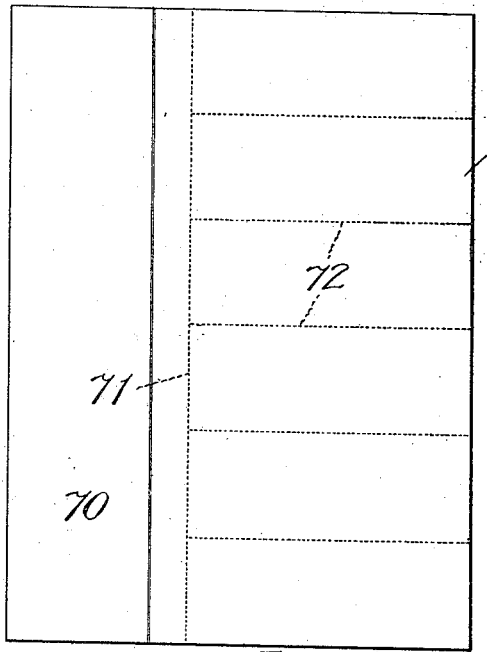

UNITED STATES PATENT OFFICE.

FREDERICK P. ROSBACK, OF BENTON HARBOR, MICHIGAN.

PERFORATING-MACHINE.

1,125,723.  Specification of Letters Patent.  Patented Jan. 19, 1915.

Application filed January 13, 1914. Serial No. 811,801.

*To all whom it may concern:*

Be it known that I, FREDERICK P. ROSBACK, a citizen of the United States, residing at Benton Harbor, in the county of Berrien and State of Michigan, have invented a new and useful Improvement in Perforating-Machines, of which the following is a specification.

My invention relates to an improvement in machines for perforating sheets to form therein weakened tearing lines; and my primary object is to provide such a machine to perforate at one operation the lines to extend at right angles to each other as they are used, say, in bank-check books, wherein the checks on each sheet have perforated tearing-lines between them extending at right-angles to a perforated line between the checks and the stubs. In the description hereinafter contained these lines are termed, respectively, the "check-line" and the "stub-line".

In the accompanying drawings, Figure 1 is a view in side elevation of my improved machine with a part of the gear-wheel casing broken away; Fig. 2 is a broken view showing in sectional elevation the clutch for operating the perforating mechanism; Fig. 3 is an enlarged section of the same on line 3, Fig. 1; Fig. 4 is a view of the machine in rear elevation; Fig. 5 is a section on line 5, Fig. 4, showing an eccentric; Fig. 6 is a plan section of the machine on the irregular line 6—6, Fig. 7; Fig. 7 is a section of the machine on line 7, Fig. 9; Fig. 8 is a broken plan view showing a gage-device; Fig. 9 is a section on the irregular line 9—9, Fig. 7; Fig. 10 is a broken view in section on line 10, Fig. 7, showing the stub-line perforating head; Fig. 11 is an enlarged section on line 11, Fig. 10; Fig. 12 is a plan view of a sheet perforated by my improved machine; Fig. 13 is an enlarged vertical section of a check-line perforating-head and its coöperating female-die member, as shown in Fig. 9; Fig. 14 is a similar view with the perforating head in its lowered position of operating on a bunch of sheets, and Fig. 15 is a section on line 15, Fig. 13.

The frame of the machine is formed of two side-members 16, 16 having extensions 17, 17 bolted to them on their upper ends and containing corresponding vertical rectangular slots like the one shown at 18 in Fig. 1. A head 19 is reciprocably confined in these slots at its ends, with which are connected, in a usual manner, rods 20 carrying on their lower ends eccentrics 21ª on the corresponding ends of a shaft 21 journaled in the lower parts of the frame-members 16, whereby rotation of the shaft reciprocates the head. The shaft carries, loosely mounted on one end, a gear-wheel 22, shown in a casing 23 and driven by a pinion 24 on the shaft of an electric motor, represented at 25, supported on the back of the frame. A rock-shaft 26, journaled in the frame-members 16 below the shaft 21, is provided between its ends with a spring-raised treadle 27 and carries on one end a pawl 28. This pawl coöperates with a clutch-device 29 on the shaft 21. The shaft contains a semi-cylindrical recess 30, and the hub 22ª of the gear contains a similar recess 31 and two rectangular recesses 32 opposite each other. A pin 33 has a semi-cylindrical intermediate section, working in the hub-recess 30 and normally held by a spring 34 in a position to protrude one corner beyond the confines of that recess into the path of the recesses 32, whereby when the protruding part of the pin strikes a recess 32 in the rotation of the shaft, the latter carries about with it the gear 22 to reciprocate the head 19. The pawl 28 extends normally into the path of a finger 34 projecting from the pin, so that at the end of each rotation of the gear the finger strikes the pawl to turn the pin 33 and house its semi-cylindrical section in the recess 30 and thus release it from engagement with a recess 32, thereby disconnecting the gear from the shaft. Each time the gear is to be rotated, the operator depresses the treadle 27 to withdraw the pawl out of the path of the finger 31 and free the spring 34 to turn the pin and protrude it for engagement with a recess 32 to rotate the gear. A feed-table 35 is shown adjustably supported in proper position and is provided near its forward edge with a groove 36 of inverted T-shape for guiding a gage 37 in setting it on the table. The gage, which is of rectangular cross section, has pivotally connected with its upright section the head of a T-shaped guide 37ª carrying set-screws 38 for truing the gage and having a guide-tongue 39 confined in the groove and releasably clamped to the stem of the guide 37ª by a thumb-screw 40.

The parts thus far described need involve no features of novelty.

The shape in cross-section of the reciprocating head 19 is best shown in Fig. 7. It contains in the face of its forwardly-projecting ledge-portion 19ª a groove 19ᵇ for confining a horizontal bar 41 bolted to the top of a punch-head 42 to carry the latter. This punch-head carries, for perforating the stub-line, headed punches 43 supported in a line of holes in a narrow ledge 44 formed in the back of the lower edge of the head and held against rising by a stop-bar 45 fastened to the inner face of the punch-head to extend over the heads of the punches. The head 42 works, for guiding it in its reciprocating movement, between an outer bar 46, shown to be provided on its front face with upper and lower horizontal reinforcing flanges, and an inner bar 47. These guide-bars are securely bolted to the forward edges of the upper side-members 17 of the frame. The ends of the bar 46 are extended backwardly across the ends of the head 42 (Fig. 6) for confining the latter endwise; and this bar carries near the bottom of its inner face a stripper 46ª, through which the punches work and are guided into holes in a female-die plate 48 (Fig. 11) supported in horizontal line with the upper surface of the feed-table below the space 49 for the sheets while undergoing perforation. The head 42 is provided with vertical slots 42ª into which extend pins 42ᵇ from the bar 46 for guiding the movement of the head.

With the punches 43 coöperate headed punches 50 extending at right-angles thereto to perforate the check-lines. Five sets or rows of these check-line punches are shown to be provided in the present machine, though the number may be greater or smaller. The punches 50 in each row are supported in holes in a ledge 52 on the face near the lower edge of a punch-head 51 and confined against rising by a stop-bar 53 extending over their heads. These punches work through guide-holes in a ledge 52ª on the lower part of the face of the bar 56. Each head 51 has a thickened upper portion formed to fit at its upper edge the contour of the bottom of the reciprocating head 19, containing a recess 54 (Fig. 7) formed by a projection 55, whereby the punch-carrying head is stably connected with the head 19 but may be adjusted, by sliding, lengthwise of the latter. Back of each head 51 is supported a guide-plate 56, with which it is adjustably connected by washer-equipped bolts 57, passing through vertical slots 58 in the punch-carrying head; and feathers 51ª on the backs of these heads work in grooves 51ᵇ in the faces of the plates 56 for guiding the heads in moving. Each guide-plate has in one lateral edge an upper recess 59 to receive a rib 60 on the rear face of the inner guide-bar 47, and a lower recess 61 to receive a rib 62 projecting on a horizontal bar 63 bolted on the frame; and the opposite edge of each guide-plate 51 has formed in it a rectangular recess 64 to embrace a bar 65 having a scale of inches and fractions of an inch marked off along its upper face, this bar being bolted at its ends to the rear edges of the frame-members 17. Vertical bars 66, bolted through their ends to the rear edges of the guide-plates 56, hold the latter on the scale-bar 64, which is recessed at 67 in its outer face, against which work set-screws 68 in the vertical bars for clamping the guide-plates rigidly in the positions to which they may be adjusted, on loosening the set-screws, by sliding them along the bar 65 and the ribs 60 and 62, thereby carrying with them the heads 51. The punches 50 work through holes in female-die strips 69ª on ledges 69, on the lower parts of the faces of the guide-plates 56, which are shown to be slotted longitudinally to afford the space 49 into which to insert into position the sheets to be perforated, and of which a plurality may be operated upon at once. On the lower part of the outer face of the guide-bar 46 is shown to be fastened a sheet-metal guard 46ᵇ for guiding into the space 49 the forward edges of sheets when out of line, as by curling upwardly.

As will thus be seen, the check-punching heads, or any of them, may be adjusted along the bar 65, and guided in their adjustment by the scale on the latter, by loosening the set-screws 68 and moving the heads 56 along their bearings 60, 62 and 65, which render their movement true, and thereby also sliding the punch-heads 51 along the recess 54 and projection 55 on the reciprocating head 19, which securely hold the punch-carrying heads in adjusted position.

Sheets 70 to be perforated with stub-lines 71 and check-lines 72 (Fig. 12) are laid on the table 35 with their left-hand edges against the gage, and with the parts of the machine in the positions in which they are illustrated, wherein the check-punching heads are properly adjusted to produce the check-lines 72, the sheets are introduced into position to be perforated under the lines of punches, when their advance-edges will strike stops 73. One of these stops is shown in Fig. 8 as a bar 74 marked off on one side with a scale of inches and fractions of an inch, and terminating at its forward end in an upright finger forming the stop 73. The bar 74 is supported to permit it to be moved longitudinally, for adjustment, in a jaw 75, to which the bar is fastened in its adjusted position by a thumb-screw 76; and the jaw embraces a ledge 77 on the rear part of the frame, to which it is fastened by a set-screw 78. With these stops suitably adjusted to properly admit the sheet or sheets into position to be perforated, after introducing the sheet or sheets, and with the motor 25 running to drive the gear 22, the operator depresses the treadle 27 to cause the gear to be clutched to and rotate the shaft 25. Each rotation of the shaft reciprocates the head 19 and works the stub and check punches to perforate the sheets as the sheet 70 is shown to be perforated. Each line of the punches is shown to incline downwardly from one end to the other. This is to cause them to perforate with a stroke like that of a shear-blade, which is a known expedient for saving power in operating the punches.

I realize that considerable variation is possible in the details of construction thus specifically shown and described, and I do not intend by illustrating a single, specific or preferred construction of my invention to be limited thereto; my intention being in the following claims to claim protection for all the novelty there may be in my invention as broadly as the state of the art will permit.

What I claim as new and desire to secure by Letters Patent is:—

1. In a perforating machine, the combination with a frame, of a reciprocating head, a pair of spaced guide-bars extending across the front of the frame, a punch-equipped head carried by the reciprocating head to work between said bars, a vertical guide-plate extending at a right-angle to said guide-bars and having a recess in its rear end, upper and lower ribs respectively on the inner guide-bar and frame entering recesses in the opposite end of the guide-plate, a scale-bar secured to the rear side of the frame and embraced by the rear recess in the guide-plate, a bar secured to the rear end of the guide plate to extend across the scale-bar and carrying a set-screw to bear against the scale-bar, and a punch-equipped head carried by the reciprocating head to work, simultaneously with said first-named punch-equipped head, across a face of the guide-plate.

2. In a perforating machine, the combination with a frame, of a reciprocating head, a punch-equipped head carried by the reciprocating head to work crosswise of the frame, a longitudinally-slotted vertical guide-plate adjustably supported to extend at a right-angle to said punch-equipped head, sheet-stops, each comprising a jaw secured on the rear part of the frame and provided with a socket and a scale-bar adjustably confined in the socket and terminating at its forward end in one upright stop-finger, and a punch-equipped head carried by the reciprocating head to work, simultaneously with said first-named punch-equipped head, across a face of the guide-plate.

3. In a perforating machine, the combination with a frame, of a reciprocating head having a forwardly-projecting ledge and a recess-forming projection on its under side, a pair of spaced guide-bars extending across the front of the frame, a punch-equipped head having a bar on its upper end confined in a groove in said ledge to carry said last-named head on the reciprocating head to work between said bars, upper and lower ribs respectively on the rear guide-bar and the frame, a scale-lever secured to the rear part of the frame, a guide-plate extending at a right-angle to said punch-equipped head and adjustably supported at its opposite ends respectively on said ribs and said scale-bar, and a punch-equipped head conforming at its upper edge to the under side of the reciprocating head to be carried thereby and worked, simultaneously with said first-named punch-equipped head, across a face of the guide-plate.

FREDERICK P. ROSBACK.

In presence of—
F. P. ROSBACK, Jr.,
FERN F. SMITH.

Copies of this patent may be obtained for five cents each, by addressing the "Commissioner of Patents, Washington, D. C."